Patented May 10, 1949

2,469,836

UNITED STATES PATENT OFFICE 2,469,836

BETA-CYANO VINYL ACETIC ACID ESTERS

Charles R. Milone, Akron, Ohio, assignor to Wingfoot Corporation, Akron, Ohio, a corporation of Delaware No Drawing. Application May 19, 1942,
Serial No. 443,646

3 Claims. (Cl. 260—465.4)

This invention relates to new compounds and, more particularly, to new ester nitriles produced from esters of acetoacetic acid and the products of hydrolysis thereof.

An ester of acetoacetic acid is, for example, reacted with hydrogen cyanide and the product is acylated to give a cyanohydrin acetate or other fatty acid ester. High yields are obtained. This product is then de-acylated. The de-acylation may yield one or more of three possible products. It appears that generally only two are produced. Although it is possible to speculate on the structure of the products obtained, there appears to be no satisfactory way of naming the products except to call them deacylation products, or more specifically de-acetylation products. The steps of the process are indicated in the following equation:

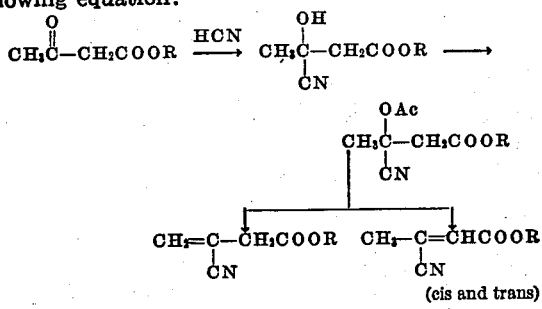

It will be noted that the ester produced may occur either as the cis or trans product. Any or all of these three products is theoretically obtainable. Whatever the products, they co-polymerize with a wide variety of monomers to give good yields of a rubber-like material. Furthermore, the esters may be hydrolyzed to the acid by any usual procedure. The following equation indicates the course of the hydrolysis, through the acid amide to the acid:

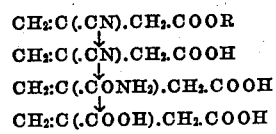

Similar changes occur in the other de-acylation products.

The invention will be further described in connection with the following examples:

Example 1

Anhydrous hydrogen cyanide was passed into 170 grams of methyl acetoacetate containing a trace of sodium cyanide until the gain in weight equalled 43 g. The temperature was kept below 50° during the addition. The cyanohydrin thus prepared was added in portions to 180 grams of 95% acetic anhydride which contained 2 ml. of concentrated sulfuric acid and was previously warmed to 60°. The addition was so regulated that the temperature did not go above 90° C. and the material was maintained at 80–90° C. for one hour after the addition was complete. Distillation yielded 222 g. of methyl beta-acetoxy-beta-cyanobutyrate, B. P. 144°/20 mm. to 142°/12 mm.; $n_D^{26}$ 1.4367; $d_{15}^{26}$ 1.1423. The yield was 83.5% of the theory. The following illustrates the reaction:

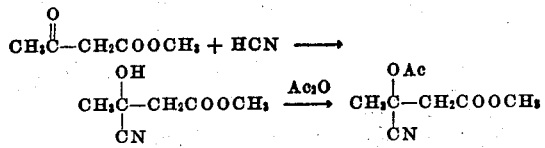

A quantity of 220 g. of the methyl beta-acetoxy-beta-cyanobutyrate was passed through a 2 ft. length of hot tube packed with Berl saddles at a temperature of 525–550° C. and 200–250 mm. pressure. The rate of flow was about 1.5 grams per minute. Distillation yielded two products comparing in physical properties as follows:

|   | B. P. | $n_D^{26}$ | $d_{15}^{26}$ | Percent N |
|---|---|---|---|---|
| 1 | 103–110/50 mm | 1.4540 | 1.0478 | 10.95, 10.8 |
| 2 | 130–135/50 mm | 1.4598 | 1.0811 | 11.15, 11.21 |

(Theoretical nitrogen is 11.20%.)

There are three compounds which might be obtained by the de-acetylation of methyl beta-acetoxy-beta-cyanobutyrate. They are all beta cyanopropylene carboxylates. The reaction is as follows:

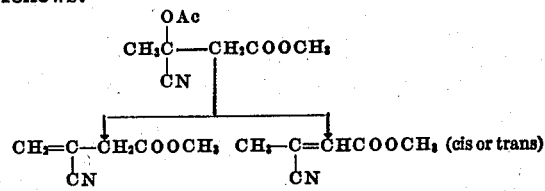

Methyl beta-cyano-2-butenoate    Methyl beta-cyanocrotonate

Two of these three possible products were isolated. However, polymerization data permit the opinion that fraction (1) is the methyl beta-cyano-2-butenoate.

Example 2

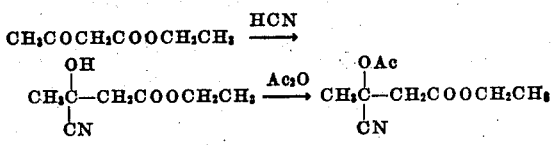

Ethyl beta-acetoxy-beta-cyanobutyrate was prepared in the same manner as the methyl ester described above. From 260 g. ethyl acetoacetate, 324 grams of the cyanohydrin was obtained (81.5% yield). B. P. 136–155°/25 mm.; $n_D^{23}$ 1.4290; $d_{15}^{23}$ 1.0986.

De-acetylation was carried out just as described in Example 1. After two distillations, two products were isolated:

| | B. P. | $n_D^{20}$ | d | Percent N |
|---|---|---|---|---|
| 1 | 95–101/30 mm | 1.4511 | $1.0362\frac{14°}{15°}$ | 9.12, 9.13 |
| 2 | 120–125/30 mm | 1.4550 | $1.0497\frac{20°}{15°}$ | 9.62, 9.65 |

(Theoretical nitrogen is 10.06%.)

In this case also there are three possible products of the reaction:

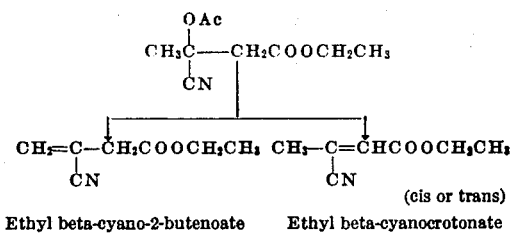

Ethyl beta-cyano-2-butenoate    Ethyl beta-cyanocrotonate

The lower boiling of the two products obtained is the butenoate.

The process is applicable to the production of other esters including the propyl, butyl, etc. benzyl, furfuryl, tetrahydrofurfuryl, cyclohexyl, methylcyclohexyl, and their chlorine substitution derivatives.

*Copolymers*

The methyl esters of Example 1 were copolymerized with butadiene (60 parts butadiene to 40 parts ester) in emulsion, with suitable catalytic conditions and buffered to various pH values. The following formula is illustrative of that employed:

| | | |
|---|---|---|
| Butadiene | grams | 9.6 |
| Ester | do | 6.4 |
| Sodium lauryl sulfate | c. c. | 10 |
| McIlvain buffer pH=7 | c. c. | 10 |
| Carbon tetrachloride | grams | 0.48 |
| 5% NaCN solution | c. c. | 0.5 |
| 10% acetaldehyde aqueous solution | c. c. | 0.5 |
| Sodium perborate | gram | 0.133 |

This was agitated 27 hours at 38° C. The following yield of copolymers were obtained, the supposed name of the monomer employed being indicated:

1. 89–93% (presumed to be methyl beta-cyano-2-butenoate)
2. 78–85% (presumed to be methyl beta-cyanocrotonate)

With 70–30 ratios, the methyl esters gave the following yields:

1. 88% agitating 21 hours at 38° C.
2. 85% agitating 25.5 hours at 38° C.

All of these copolymers are rubber-like, but differ from each other somewhat in certain properties.

The ethyl esters, when copolymerized in the ratio of 40 parts ester to 60 parts butadiene, employing suitable conditions of emulsion, catalysts, pH, etc. such as in the preceding examples, give the following yields in 25 hours at 38°:

1. Up to 67%
2. Up to 61%

These products are also rubber-like, but as rubber substitutes appear to be inferior to the corresponding methyl esters. The other esters may be similarly polymerized.

The invention is not limited to the specific compounds above mentioned. Other esters may be used, and the deacylation products obtained may be copolymerized with other monomers, including acrylonitrile, substituted acrylonitriles including the alpha chloro acrylonitriles and the alpha alkyl substituted acrylonitriles, acrylates, substituted acrylates including the alpha substituted halo acrylates such as the alpha chloro acrylates and the alkyl substituted acrylates including the methacrylates and ethacrylates, styrene, alkyl substituted styrenes, vinyl chloride, vinylidene chloride, and dienes including butadiene, isoprene and dimethyl butadiene, etc. These monomers may be represented by the structural formula $CH_2:CRR'$ where R is hydrogen, halogen or a methyl group and R' is phenyl, tolyl, carboxylate, nitrile, an aliphatic hydrocarbon group, a halogen or $-CR:CH_2$ where R is as previously defined. The copolymers are protected in my companion application Serial No. 479,339, now abandoned. Application Serial No. 405,998 of John R. Long, filed August 8, 1941, now Patent No. 2,391,251, describes and claims the cyanhydrin derivatives of other fatty-acid esters and the method of preparing the same.

I claim:
1. A compound having the structural formula

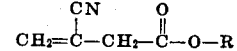

wherein R is an alkyl radical.

2. A compound having the structural formula

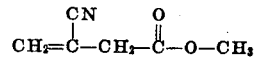

3. A compound having the structural formula

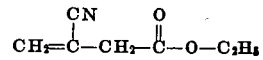

CHARLES R. MILONE.

REFERENCES CITED

The following references are of record in the file of this patent:

UNITED STATES PATENTS

| Number | Name | Date |
|---|---|---|
| 2,191,738 | Balle | Feb. 27, 1940 |
| 2,265,814 | Ritchie et al. | Dec. 9, 1941 |
| 2,293,969 | Crawford | Aug. 25, 1942 |
| 2,300,566 | Hahn | Nov. 3, 1942 |
| 2,301,131 | Lichty | Nov. 3, 1942 |

OTHER REFERENCES

Anschutz, Liebigs Annalen der Chemie, vol. 461, p. 173 (1928).
Anschutz, Berichte, vol. 13, p. 1542.
Claus et al.: Berichte, vol. 14, p. 1090.
Pinner, Berichte, vol. 18, p. 2846.
Shestakov et al.; J. Russ. Phys. Chem. Soc., vol. 44, pp. 1312–13.
Ultee: Rec. des trav. Chim. des Pays-Bas, vol. 28, p. 21.
Wolf: Bull. soc. chim. Belg., vol. 46, pp. 256–257.